United States Patent
Persson

[11] Patent Number: 5,974,863
[45] Date of Patent: Nov. 2, 1999

[54] METHOD AND DEVICE FOR LIQUID LEAKAGE INDICATION

[76] Inventor: Lars-Anders Persson, Tvärgatan 11, S-260 20 Teckomatorp, Sweden

[21] Appl. No.: 09/051,626
[22] PCT Filed: Oct. 16, 1996
[86] PCT No.: PCT/SE96/01308
§ 371 Date: Apr. 15, 1998
§ 102(e) Date: Apr. 15, 1998
[87] PCT Pub. No.: WO97/14943
PCT Pub. Date: Apr. 24, 1997

[30] Foreign Application Priority Data

Oct. 16, 1995 [SE] Sweden .................................. 9501401
May 14, 1996 [SE] Sweden .................................. 9601831

[51] Int. Cl.$^6$ .............................. G01M 3/24; F25B 49/00
[52] U.S. Cl. .................... 73/40.5 R; 73/19.03; 73/64.53; 62/126; 62/129; 324/639; 324/642
[58] Field of Search ................. 73/19.03, 64.53, 73/40.5 R; 324/637, 639, 642; 62/126, 129

[56] References Cited

U.S. PATENT DOCUMENTS

| | | |
|---|---|---|
| 4,107,993 | 8/1978 | Shuff et al. . |
| 4,138,879 | 2/1979 | Liebermann .......................... 73/19.03 |
| 4,167,736 | 9/1979 | Tomlinson . |
| 4,235,095 | 11/1980 | Liebermann .......................... 73/19.03 |
| 4,279,167 | 7/1981 | Erb et al. . |
| 4,333,353 | 6/1982 | Baumoel . |
| 4,418,565 | 12/1983 | St. John ................................ 73/19.03 |
| 4,419,883 | 12/1983 | Gelston, II ......................... 324/642 X |
| 4,607,520 | 8/1986 | Dam ........................................ 73/19.03 |
| 4,644,755 | 2/1987 | Esslinger et al. ......................... 62/126 |
| 4,651,085 | 3/1987 | Sakurai et al. ....................... 324/639 X |
| 4,833,918 | 5/1989 | Jean et al. . |
| 4,843,894 | 7/1989 | Yashiro et al. . |
| 5,156,012 | 10/1992 | Kuribara et al. ................... 73/19.01 X |
| 5,205,153 | 4/1993 | Hlavinka et al. . |

FOREIGN PATENT DOCUMENTS

| | | |
|---|---|---|
| 2 658 617 | 8/1991 | France . |
| 6347564 | 12/1994 | Japan . |
| 1 474 469 | 5/1977 | United Kingdom . |

*Primary Examiner*—Daniel S. Larkin
*Attorney, Agent, or Firm*—Mathews, Collins, Shepherd & Gould, P.A.

[57] ABSTRACT

Method and device for indicating movements of gas bubbles in a liquid, droplets of liquid in a gas or a level of liquid, the liquid or the gas forming a medium in a conduit (15) or a container. Microwave signals of a predetermined frequency are transmitted through a section (G) of the conduit (15) or the container (16) that is pervious to microwaves toward said medium, and microwave signals reflected from the medium are received. Received microwave signals are then utilized to indicate presence of gas bubbles, droplets, or a level of a liquid moving in said conduit (15) or said container (16).

Said conduit (15) is designed with a section (G) that is pervious to microwaves, and a microwave transmitter (S) is provided to transmit microwave signals towards said section (G). A microwave receiver (M) is provided to receive microwave signals that are reflected from the medium, and said microwave receiver (M) is operatively connected to a detector (6).

16 Claims, 2 Drawing Sheets

METHOD AND DEVICE FOR LIQUID LEAKAGE INDICATION

TECHNICAL FIELD

It is common knowledge that large amounts of discharges having a high chloride content continuously are released to the atmosphere. These discharges will affect the ozone layer and cause a breakdown thereof resulting in so called ozone holes. In turn, this will lead to an increase of radiation and also of the global heating level (greenhouse effect). A large amount of such discharges emanates from chlorine or fluorine compounds that are commonly used in connection with cooling mediums. Leaky refrigerating, air condition and freezing plants, heat pumps, etc. will cause major discharges and, therefore, it is extremely important that incipient leaks from such devices are detected in good time to make it possible to accomplish sealing and eliminating discharges.

PRIOR ART

One previously known method to indicate leakage of cooling mediums is to install a cooling medium alarm, such as a gas alarm. However, a disadvantage using this method of generating an alarm is that it will indicate only at a direct contact with the flow of cooling medium vapour (gas). As a result, such means are normally installed in close connection to the refrigerating apparatus or alternatively in a refrigerating machine room. As a result of using a normal arrangement with different components comprised in the refrigerating system being located at a far distance from each other, said method is not satisfactory if the leak occurs, for instance, outside the refrigerating machine room or perhaps in a cooling battery in a cold storage that can be 30 or 40 meters away from the refrigerating machine room. There will also be no indication of leakage from condensers, tubes, etc. located outdoors.

Another method of indicating leakage of cooling mediums is to mount a detector indicating bubbles of gas within the fluid conduit. There is, however, a drawback using this kind of detector because it is partly mounted within the fluid conduit and therefore has to be sealed, for instance, by a pipe nipple. Because of such a pipe nipple, there is always a risk of a cooling medium leak. If there is a problem with the detector, the cooling medium has to be moved into a cooling medium container of the refrigerating machine so as to exchange or repair the detector. Refrigerating machines lacking such a container have to be evacuated before exchange or repair. To avoid possible risks of cooling medium systems it is recommended by the national environment protection board to move from bolted joints to soldered joints, where it is possible, to provide tight systems.

SUMMARY OF THE INVENTION

An object of the invention is to provide a device which prevents a leak of cooling medium to the atmosphere and which as a distinctive feature immediately when there is a leak of cooling medium in a cooling medium system will indicate and after a predetermined delay will start an alarm such that appropriate measures can be taken so as to quickly repair the leak and stop the discharge. The device according to the invention comprises a microwave detector which is mounted outside of a sight glass which either is mounted in or soldered to the fluid conduit and through which the cooling medium flows. Alternatively, the microwave detector and the sight glass are integrated and enclosed by a housing made of a material which does not transmit the microwaves. As a result, false alarms due to external movements, such as from rotating fans, etc., are prevented.

The device is intended to be positioned after the drying filter, with respect to the flow direction in the fluid conduit. Since the microwave detector is positioned outside of the sight glass in the cooling medium system and because of that never will come into contact with the cooling medium fluid in the closed cooling system no problems of leaking can arise. Another advantage of the microwave detector is that no interference of the cooling medium system will occur, should an exchange be required.

The invention can be used also more in general for other purposes. Instead of indicating an unwanted existence of gas in a liquid also, an unwanted existence of liquid in gas can be indicated. In connection with the food manufacturing industry, many manufacturing and packaging processes exist for which the invention can be used to indicate quickly air bubbles in a fluid flow. In a similar way, the invention can be used to indicate gases in petrol and liquids in different kinds of gas pipes. A further application is in lacquering where the invention is used to check that there is no air within the paint conduits. In connection with heat exchangers, any leaks between exchange mediums can be indicated. In the medical care field this invention may be used in many treatments where it is very important to check liquid flows and to indicate existence of gas or air in the liquid.

The Working principle of the detector is that the receiver registers reflections of a signal that is transmitted from the transmitter. According to the Doppler effect, this reflected signal will have a lower frequency if a reflecting object moves away from the detector and a higher frequency if the object approaches the transmitter. The high frequency corresponds to a very short wave length which makes a very small relocation result in a large change of frequency which in turn makes the sensitivity very high. During normal operating conditions, the cooling medium, a clear transparent liquid (corresponding to water), flows through the sight glass without any formation of gas. If, however, there is a leakage of the cooling medium, gas bubbles will be formed and brought along the medium, which will be indicated by the microwave detector, and an alarm will be triggered. Since the gas bubbles will be formed immediately if the amount of cooling medium will drop, an extremely early alarm will be triggered and by fast measures large cooling medium amounts can be stopped from escaping and polluting the atmosphere. Furthermore, the properties of the device will result in savings to the user with regard to the costs for cooling media and minimized amounts of wasted foodstuffs. Also, the latter should be interesting to such companies that are responsible for insurance matters. A further advantage of the device is that a restriction or partial jamming of the drying filter will indicate gas bubbles formed in the sight glass therefrom which will make it possible to contact a service agency before there is any chance of damages to the plant or to any articles. In a plant comprising a plurality of separate cooling systems, each system can be provided with the claimed device and all devices can be connected to a common alarm central, from which alarms can be forwarded as desired, for instance through the telecommunication network.

BRIEF DESCRIPTION OF THE DRAWINGS

The invention will now be described in more detail, reference being made to the accompanying drawings in which.

DETAILED DESCRIPTION

Figure 1:
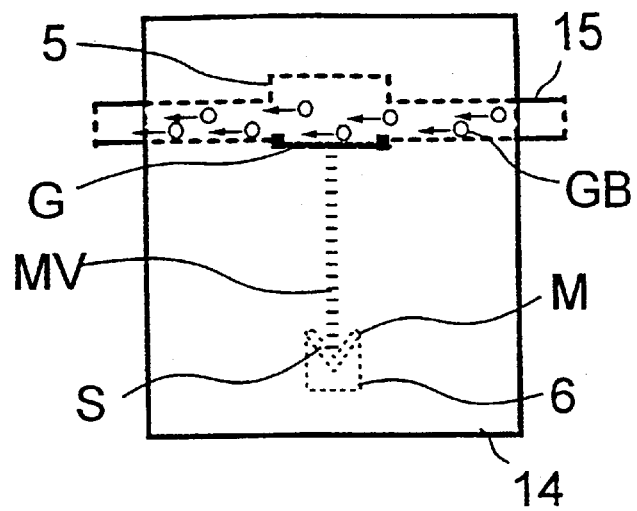
FIG. 1 shows a device for detecting leakage of cooling media liquids in a cooling system.

In the embodiment shown in FIG. 1, a microwave detector 6, comprising transmitter S and receiver M, microwaves MV towards a sight glass 5 disposed in a fluid conduit 15. When said microwaves pass glass G of the sight glass 5, they will strike gas bubbles GB and will be reflected towards receiver M that will record a change of frequency due to the movement of the gas bubbles. Thus, the microwave detector will indicate the existence of gas bubbles and will activate an alarm central. When there are no gas bubbles present in the sight glass, but only a flow of liquid through it, the microwave detector will not react to circulating movements of the medium in the closed cooling system. Element 14 will stop the microwaves from being affected by movements occurring outside said element, such as from rotating fan blades, etc., so as to avoid false alarms.

When several detectors are located in the same refrigerating machine room, they can use modulated carriers so as not to interfere with each other. Said element 14 can also be designed to prevent microwave signals from one detector from reaching other detectors. The microwave detector is an active detector comprising a transmitter and a receiver in one housing. The detector transmits and receives in a frequency area around 10 GHz.

Figure 2:
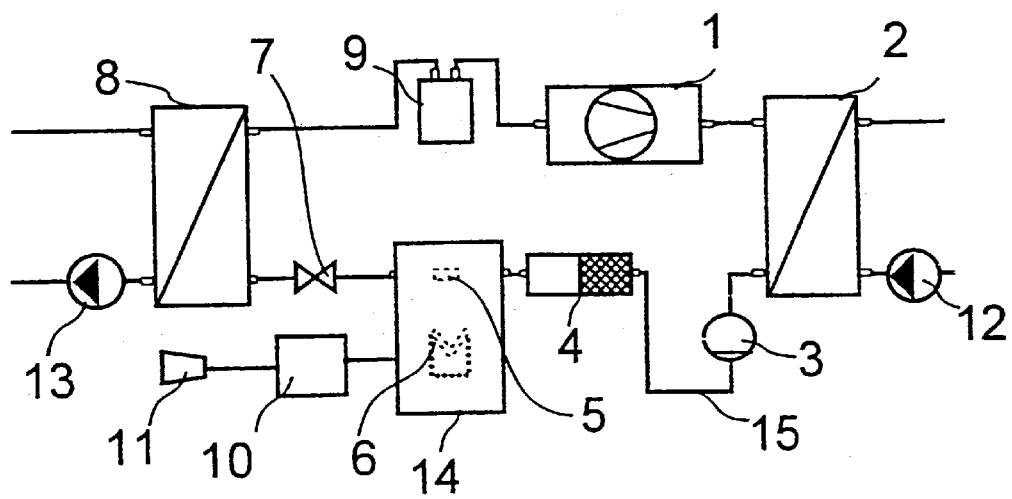
FIG. 2 shows schematically a cooling media system.
Figure 3:
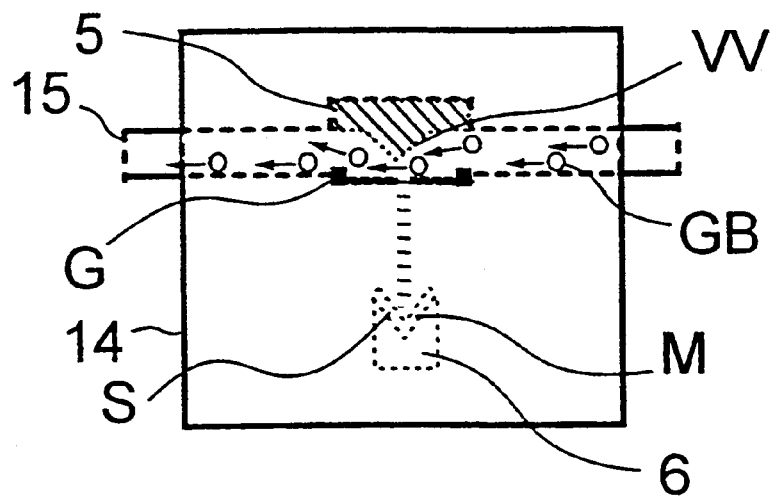
FIG. 3 shows a device for detecting leakage of cooling media liquids in a cooling system.

FIG. 2 schematically shows the invention in use in a cooling medium system in which a cooling medium in the form of a high pressure vapour is pumped by a compressor 1 to a condenser 2. In said condenser 2, the cooling medium is cooled and will transform into a liquid state. The liquid continues to a cooling medium container 3, then through fluid conduit 15, through a drying filter 4 and said sight glass 5 to an expansion valve 7. During the passage through the expansion valve 7 and an evaporator 8, the pressure of the cooling medium is lowered at which the medium will transform into a vapor phase. The a vapor is then transferred by suction through liquid separator 9 back to the compressor 1. When there is a leakage, the amount of liquid in the cooling medium container 3 is decreased and gas bubbles are generated and flow along with the cooling medium towards the expansion valve 7. When these gas bubbles pass by the sight glass 5, this will be indicated by the microwave detector 6, which transmits a signal to an alarm central 10, which in turn, after an adjustable time delay, will forward the alarm to an alarm receiver 11. Normal disturbances occurring in the sight glass during starting and shutdown and also during intermittent operation of condenser fans will not trigger the alarm. These signals will have a too short duration and they will not exceed the adjustable time length chosen. As a result, false alarms are avoided and the system will have an extreme adaptability to each separate working condition. During downtimes when there is no demand for cooling, the indication of alarm can be automatically disconnected to be switched on automatically when the refrigerating compressor starts. Pumps 12 and 13 will pump an appropriate heat transfer medium through the condenser 2 and the evaporator 8 for receiving and transmitting, respectively, heat. FIG. 3 shows an alternative embodiment of a device according to the invention for detecting leakage of cooling medium liquid in a cooling system. The function corresponds to the function described in connection with FIG. 1, one difference being that gas bubbles GB in this embodiment are forced against glass G of the sight glass 5 by an angular wall VV. By using this type of sight glass, an improved sensitivity is obtained because the sensitivity is higher when the gas bubbles flow towards and hit the glass of the sight glass.

In further different embodiments of the invention, a section G, transparent to microwaves of a container 16 is provided at a desired level of the container. The microwave arrangement according to the description above is provided to transmit microwave signals towards said section G. When the level of a liquid enclosed in a container 16 rises or falls past said section G, the detector 6 will produce an indication thereof and emit an appropriate alarm signal.

Figure 4:
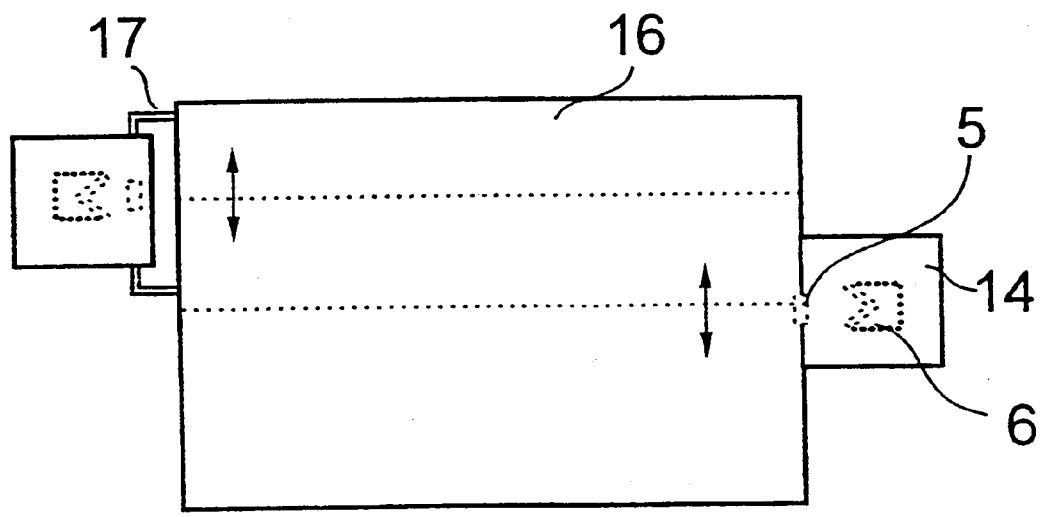
FIG. 4 shows schematically an embodiment of the device in an alternative application.

One example of such an embodiment is shown in FIG. 4. A container 16 is provided with some kind of sight glass 5. To the left of the figure, there is shown a sight glass 5 disposed in a riser 17. To the right of the figure, there is shown a sight glass 5, which instead, is disposed in the wall of the container 16.

I claim:

1. A method of indicating leakage of liquid, forming a medium bounded by liquid bounding means, the method comprising the steps of:

transmitting microwave signals of a predetermined frequency through a section (G) of said liquid bounding means which is pervious to said microwave signals towards said medium, receiving microwave signals affected by movements of gas bubbles in the medium, and utilizing said received microwave signals to indicate presence of gas bubbles passing by said pervious section (G) of said liquid bounding means.

2. A method according to claim 1, further including the steps of:

determining a change of frequency between transmitted and received microwave signals, an existence of such a change indicating presence of bubbles moving in said liquid bounding means.

3. A method according to claim 1, including the steps of driving said gas bubbles to move close to said pervious section (G) of said liquid bounding means.

4. A method according to claim 1, wherein said liquid bounding means comprises a conduit.

5. A method according to claim 1, wherein said liquid bounding means comprises a container.

6. A device for indicating leakage of a liquid forming a medium bounded by liquid bounding means, said device comprising:

a microwave transparent section (G) disposed in a wall of said liquid bounding means;

microwave transmitter means for transmitting microwave signals of a predetermined frequency through said section (G) towards said medium;

microwave receiver means for receiving microwave signals that are reflected from said medium;

housing means for shielding said microwaves to prevent surrounding interferences from reaching the receiver means, and detector means for transmitting an indicating signal on existence of movement of gas bubbles passing by said section (G), said detector means being operatively connected to said microwave receiver means.

7. A device according to claim 6, wherein said detector means is designed to determine a change of frequency between transmitted and received microwave signals.

8. A device according to claim 6, wherein
said transmitter means and said receiver means are designed to transmit and receive, respectively, in a frequency area around 10 Ghz.

9. A device according to claim 6, wherein
said transmitter means and said receiver means are provided outside said liquid bounding means without contact with the medium.

10. A device according to claim 6, wherein
said liquid bounding means comprises a conduit which is provided in a cooling medium system, and
said section (G) being provided between a condenser and an expansion valve.

11. A device according to claim 10, wherein
said section (G) comprises a part of a sight glass in an existing cooling medium system.

12. A device according to claim 6, wherein
said detector means is operatively connected to an alarm central and
said alarm central is designed to transmit an alarm to alarm receivers after an adjustable time delay.

13. A device according to claim 6, wherein said liquid bounding means comprises a conduit.

14. A device according to claim 13, wherein said housing means being formed as a box disposed above said existing conduit.

15. A device according to claim 6, wherein said liquid bounding means comprises a container.

16. A device according to claim 15, wherein said housing means is formed as a box that is at least part of said container.

* * * * *